(12) United States Patent
Sultan et al.

(10) Patent No.: US 11,421,721 B2
(45) Date of Patent: Aug. 23, 2022

(54) TIE-ROD ASSEMBLY WITH ADJUSTABLE LENGTH

(71) Applicant: THE BOEING COMPANY, Chicago, IL (US)

(72) Inventors: Saif Sultan, Bothell, WA (US); Edward H. Chue, Bothell, WA (US); Sean R. Cysewski, Snohomish, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/548,252

(22) Filed: Aug. 22, 2019

(65) Prior Publication Data

US 2021/0054863 A1 Feb. 25, 2021

(51) Int. Cl.
*F16C 7/06* (2006.01)
*F16B 7/18* (2006.01)
*F16B 31/00* (2006.01)
*F16B 7/10* (2006.01)

(52) U.S. Cl.
CPC .............. *F16B 7/18* (2013.01); *F16B 7/10* (2013.01); *F16B 31/00* (2013.01); *F16C 7/06* (2013.01)

(58) Field of Classification Search
CPC .............. F16C 7/06; F16B 7/18; F16B 31/00
See application file for complete search history.

(56) References Cited

U.S. PATENT DOCUMENTS

| 6,902,341 B1* | 6/2005 | Rauschert | F16C 11/0623 403/301 |
| 2004/0005824 A1* | 1/2004 | Zeiger | B63H 20/12 440/63 |
| 2009/0218777 A1* | 9/2009 | Wood | B64C 1/06 280/93.51 |
| 2010/0055383 A1* | 3/2010 | Schalla | E04C 3/291 428/99 |

(Continued)

FOREIGN PATENT DOCUMENTS

EP 1050693 A1 * 11/2000 ............. F01D 25/28

OTHER PUBLICATIONS

Machine Translation of EP 1,050,693, obtained Oct. 9, 2020.*

(Continued)

*Primary Examiner* — Richard W Ridley
*Assistant Examiner* — Brian J McGovern
(74) *Attorney, Agent, or Firm* — Marshall, Gerstein & Borun LLP

(57) ABSTRACT

A tie-rod assembly includes a tube member having a first set of threads at a first end of the tube member and a second set of threads at a second end of the tube member. The tie-rod assembly includes a first clevis coupling assembly having a first width dimension and a third set of threads compatible with first set of threads and first clevis coupling assembly has a second width dimension which includes a portion of the third set of threads with the second width dimension greater than the first width dimension. Further included is second clevis coupling assembly having a third width dimension and a fourth set of threads compatible with second set of threads and the second clevis coupling assembly has a fourth width dimension which includes a portion of the fourth set of threads with the fourth width dimension greater than the third width dimension.

21 Claims, 10 Drawing Sheets

(56) References Cited

U.S. PATENT DOCUMENTS

| | | | | |
|---|---|---|---|---|
| 2012/0125146 A1* | 5/2012 | Boveroux | ............... | B29C 70/86 |
| | | | | 74/579 R |
| 2012/0224913 A1* | 9/2012 | Haller | ...................... | F16B 7/06 |
| | | | | 403/46 |
| 2013/0183087 A1* | 7/2013 | Weibel | ..................... | F16B 7/18 |
| | | | | 403/343 |
| 2015/0292549 A1* | 10/2015 | Cowles, Jr. | ............... | F16C 7/02 |
| | | | | 74/581 |
| 2016/0123380 A1* | 5/2016 | Godon | ................. | B29C 65/544 |
| | | | | 403/66 |

OTHER PUBLICATIONS http://www.ro-ra.com/en/home, 2018.
https://www.dextragroup.com/activities/technical-solutions-for-construction/solutions/27-engineered-bar-systems/roofs-facades/84-tension-bar-systems, 2018.
https://www.ronstan.com/marine/range.asp?RnID=156, 2018.
https://www.velasailingsupply.com/hayn-marine-swage-to-swage-tubular-turnbuckle-1-8-wire-1-4-28-thread, 2019.
https://www.besttradetools.co.nz/collections/concreting-hand-tools-telescopic-handles/products/kraft-concrete-clevis-adapter-to-13-4-inch-snap-handle, 2019.
https://cablerailingdirect.com/product/terminal-factory-swaged-fixed-jaw-clevis-316-cable-2, 2019.
https://sa.rsdelivers.com/products-pro/3140104058/rs-pro-steel-m10-x-15-clevis-52mm-x-20mm/3120214, 2019.
https://www.arcuswire.com/product/pipe-turnbuckle-jaweye-333, 2019.

* cited by examiner

TIE-ROD ASSEMBLY WITH ADJUSTABLE LENGTH

FIELD

This disclosure relates to tie rods and more particularly to tie rods which have an adjustable length.

BACKGROUND

Tie-rod assemblies are generally slender structural assemblies used to tie together two structures and are generally used in carrying tensile loadings. The tie-rod assembly includes a centrally positioned tube or rod member, which includes opposing end connection assemblies to attach the tie-rod assembly to the two structures. In an aerospace application, such as for example in the construction of an aircraft, a tie-rod assembly is generally attached to a primary and secondary structure within the aircraft and are made to a particular length to accommodate the particular length needed to attach to the two structures together. This accommodation of providing tie-rod assemblies of a particular length is in the interest of avoiding imparting excess weight to an operational aircraft which can be contributed by excess tie-rod assembly not used in the particular application. As a result, many tie-rods of different particular lengths are fabricated to address the various length requirements needed in the construction of the aircraft, however, having to produce numerous tie rod assemblies of different lengths requires incurring significant engineering design and fabrication costs.

SUMMARY

An example includes a tierod assembly which includes a tube member having a first set of threads at a first end of the tube member and a second set of threads at a second end of the tube member. The tie-rod assembly includes a first clevis coupling assembly, which includes a first width dimension and a third set of threads compatible for engaging the first set of threads of the tube member. The first clevis coupling assembly has a second width dimension extending across the first clevis coupling assembly which includes a portion of the third set of threads wherein the second width dimension is greater than the first width dimension. The tie-rod assembly further includes a second clevis coupling assembly, which includes a third width dimension and a fourth set of threads compatible for engaging the second set of threads of the tube member. The second clevis coupling assembly has a fourth width dimension extending across the second clevis coupling assembly which includes a portion of the fourth set of threads wherein the fourth width dimension is greater than the third width dimension.

Another example includes a method for fabricating a tie-rod assembly, which includes a step of extruding a tube member and turning a first set of threads in a first end of the tube member and a second set of threads in a second end of the tube member. The method further includes swaging a first tube forming a first clevis coupling assembly, which includes a first width dimension and turning a third set of threads in the first clevis coupling assembly compatible for engaging to the first set of threads of the tube member and the first clevis coupling assembly has a second width dimension extending across the first clevis coupling assembly which includes a portion of the third set of threads wherein the second width dimension is greater than the first width dimension. The method further includes impact extruding a second clevis assembly, which includes a third width dimension and turning a fourth set of threads in the second clevis coupling assembly compatible for engaging to the second set of threads of the tube member and the second clevis coupling assembly has a fourth width dimension which extends across the second clevis coupling assembly which includes a portion of the fourth set of threads wherein the fourth width dimension is greater than the third width dimension.

Another example includes a system, which includes a first structure, a second structure and a tie-rod assembly coupling the first structure and the second structure. The tie-rod assembly includes a tube member having a first set of threads at a first end of the tube member and a second set of threads at a second end of the tube member. The system further includes a first clevis coupling assembly, which includes a first width dimension and a third set of threads compatible for engaging the first set of threads of the tube member. The first clevis coupling assembly has a second width dimension extending across the first clevis coupling assembly which includes a portion of the third set of threads wherein the second width dimension is greater than the first width dimension. A second clevis coupling assembly includes a third width dimension; and a fourth set of threads compatible for engaging the second set of threads of the tube member. The second clevis coupling assembly has a fourth width dimension extending across the second clevis assembly which includes a portion of the fourth set of threads. The fourth width dimension is greater than the third width dimension.

Clause 1: A tie-rod assembly comprising a tube member having a first set of threads at a first end of the tube member and a second set of threads at a second end of the tube member; a first clevis coupling assembly comprising a first width dimension and a third set of threads compatible for engaging the first set of threads of the tube member and the first clevis coupling assembly has a second width dimension extending across the first clevis coupling assembly which includes a portion of the third set of threads wherein the second width dimension is greater than the first width dimension; and a second clevis coupling assembly comprising a third width dimension and a fourth set of threads compatible for engaging the second set of threads of the tube member and the second clevis coupling assembly has a fourth width dimension extending across the second clevis coupling assembly which includes a portion of the fourth set of threads wherein the fourth width dimension is greater than the third width dimension.

Clause 2: The tie-rod assembly of Clause 1 wherein the first clevis coupling assembly comprises a first lug assembly having the first width dimension and a first coupling assembly having the third set of threads and having the second width dimension; and wherein the second clevis coupling assembly comprises a second lug assembly having the third width dimension and a second coupling assembly having the fourth set of threads and having the fourth width dimension.

Clause 3: The tie-rod assembly of Clause 2 wherein the third set of threads defines a first pitch diameter which extends through the third set of threads and is positioned about an axis of the first coupling assembly; the second width dimension which extends from the first pitch diameter on a first side of the first coupling assembly, through the axis of the first coupling assembly and to the first pitch diameter positioned on a second opposing side of the first coupling assembly; the fourth set of threads defines a second pitch diameter which extends through the fourth set of threads and is positioned about an axis of the second coupling assembly; and the fourth width dimension, which extends from the second pitch diameter on a first side of the second coupling assembly, through the axis of the second coupling assembly and to the second pitch diameter positioned on a second opposing side of the second coupling assembly.

Clause 4: The tie-rod assembly of Clauses 2 or 3, wherein the first set of threads are defined within an external side of a first end portion of the tube member and the second set of threads are defined within an internal side of a second end portion of the tube member.

Clause 5: The tie-rod assembly of Clause 4, wherein the first coupling assembly comprises a first cylindrical wall portion with a first transition wall member which connects the first cylindrical wall portion to the first lug assembly; the third set of threads are defined within an internal side of the first cylindrical wall portion; and the first lug assembly comprises a first wall enclosure which defines two spaced apart planar wall portions and two spaced apart curved wall portions with aligned bores defined through the two spaced apart planar wall portions.

Clause 6: The tie-rod assembly of Clauses 4 or 5, wherein the second coupling assembly comprises a second cylindrical wall portion with a second transition wall member which connects the second cylindrical wall portion to the second lug assembly; the fourth set of threads are defined within an external side of the second cylindrical wall portion; and the second lug assembly comprises a wall member, which extends from the second transition wall member and defines two planar sides and two curved sides with a bore defined extending through the wall member and the two planar sides.

Clause 7: The tie-rod assembly of any of Clauses 2-6, wherein the first set of threads are defined within an external side of a first end portion of the tube member and the second set of threads are defined within an external side of a second end portion of the tube member.

Clause 8: The tie-rod assembly of Clause 7, wherein the first coupling assembly comprises a first cylindrical wall portion with a first transition wall member which connects the first cylindrical wall portion to the first lug assembly; the third set of threads are defined in an internal side of the first cylindrical wall portion; and the first lug assembly comprises a first wall enclosure which defines two spaced apart planar wall portions and two spaced apart curved wall portions with aligned bores defined through the two spaced apart planar wall portions.

Clause 9: The tie-rod assembly of Clauses 7 or 8, wherein the second coupling assembly comprises a second cylindrical wall portion with a second transition wall member which connects the second cylindrical wall portion to the second lug assembly; the fourth set of threads are defined in an internal side of the second cylindrical wall portion; and the second lug assembly comprises a wall member which extends from the second transition wall member and defines two planar sides and two curved sides with a bore defined extending through the wall member and the two planar sides.

Clause 10: The tie-rod assembly of any of Clauses 2-9, wherein the first set of threads are defined within an internal side of a first end portion of the tube member and the second set of threads are defined within an internal side of a second end portion of the tube member.

Clause 11: The tie-rod assembly of Clause 10, wherein the first coupling assembly comprises a first cylindrical wall portion with a first transition wall member which connects the first cylindrical wall portion to the first lug assembly; the third set of threads are defined in an external side of the first cylindrical wall portion; and the first lug assembly comprises a first wall enclosure which defines two spaced apart planar wall portions and two spaced apart curved wall portions with aligned bores defined through the two spaced apart planar wall portions.

Clause 12: The tie-rod assembly of Clause 10 or 11, wherein the second coupling assembly comprises a second cylindrical wall portion with a second transition wall member which connects the second cylindrical wall portion to the second lug assembly; the fourth set of threads are defined in an external side of the second cylindrical wall portion; and the second lug assembly comprises a wall member which extends from the second transition wall member and defines two planar sides and two curved sides with a bore defined extending through the wall member and the two planar sides.

Clause 13: The tie-rod assembly of any of Clauses 2-12, wherein the first set of threads are defined within an external side of a first end portion of the tube member and the second set of threads are defined within an internal side of a second portion of the tube member; and the first end portion of the tube member has a wall thickness dimension greater than a wall thickness of a central portion of the tube member positioned between the first end portion and second end portion of the tube member and the second end portion has a second wall thickness greater than the wall thickness of the central portion of the tube member.

Clause 14: The tie-rod assembly of Clause 13, wherein the first coupling assembly comprises a first cylindrical wall portion with a first transition wall member which connects the first cylindrical wall portion to the first lug assembly; the third set of threads are defined within an internal side of the first cylindrical wall portion; and the first lug assembly comprises a first wall enclosure which defines two spaced apart planar wall portions and two spaced apart curved wall portions with aligned bores defined through the two spaced apart planar wall portions.

Clause 15: The tie-rod assembly of Clauses 13 or 14, wherein the second coupling assembly comprises a second cylindrical wall portion with a second transition wall member which connects the second cylindrical wall portion to the second lug assembly; the fourth set of threads are defined within an external side of the second cylindrical wall portion; and the second lug assembly comprises a wall member, which extends from the second transition wall member and defines two planar sides and two curved sides with a bore defined extending through the wall member and the two planar sides.

Clause 16: The tie-rod assembly of any of Clauses 1-15, wherein the first set of threads is one of a right hand thread or a left hand thread and the second set of threads is other of the one of the right hand thread or the left hand thread of the first set of threads.

Clause 17: A method for fabricating a tie-rod assembly comprising extruding a tube member and turning a first set of threads in a first end of the tube member and a second set of threads in a second end of the tube member; swaging a first tube forming a first clevis coupling assembly, which includes a first width dimension and turning a third set of threads in the first clevis coupling assembly compatible for engaging to the first set of threads of the tube member and the first clevis coupling assembly has a second width dimension extending across the first clevis coupling assembly which includes a portion of the third set of threads wherein the second width dimension is greater than the first width dimension; and impact extruding a second clevis coupling assembly, which includes a third width dimension and turning a fourth set of threads in the second clevis coupling assembly compatible for engaging to the second set of threads of the tube member and the second clevis coupling assembly has a fourth width dimension which extends across the second clevis coupling which includes a portion of the fourth set of threads wherein the fourth width dimension is greater than the third width dimension.

Clause 18: The method of Clause 17 wherein the first clevis coupling assembly includes a first lug assembly having the first width dimension and a first coupling assembly connected to the first lug assembly; and the first coupling assembly having the third set of threads and having the second width dimension; and wherein the second clevis coupling assembly includes a second lug assembly having the third width dimension and a second coupling assembly connected to the second lug assembly; and the second coupling assembly having the fourth set of threads and having the fourth width dimension.

Clause 19: The method of Clause 18, wherein the third set of threads defines a first pitch diameter which extends through the third set of threads and is positioned about an axis of the first coupling assembly; the second width dimension, which extends from the first pitch diameter on a first side of the first coupling assembly, through the axis of the first coupling assembly and to the first pitch diameter positioned on a second opposing side of the first coupling assembly; the fourth set of threads defines a second pitch diameter which extends through the fourth set of threads and is positioned about an axis of the second coupling assembly; and the fourth width dimension, which extends from the second pitch diameter of the first side of the second coupling assembly, through the axis of the second coupling assembly and to the second pitch diameter positioned on a second opposing side of the second coupling assembly.

Clause 20: The method of Clause 18 or 19, further including boring aligned bores through two spaced apart planar wall portions of the first lug assembly; and boring a bore through a wall member of the second lug assembly.

Clause 21: The method of any of Clauses 17-20, further including swaging the tube member such that the first end of the tube member has a first wall thickness dimension greater than a second wall thickness of a central portion of the tube member positioned between the first end and the second end of the tube member; and the second end has a third wall thickness greater than the second wall thickness of the central portion of the tube member, wherein the first set of threads is positioned in the first end of the tube member and the second set of threads is positioned in the second end of the tube member.

Clause 22: The method of any of Clauses 17-21, wherein the first set of threads is one of a right hand thread or a left hand thread and the second set of threads is other of the one of the right hand thread or left hand thread of the first set of threads.

Clause 23: A system comprising a first structure, a second structure, and a tie-rod assembly coupling the first structure and the second structure, the tie-rod assembly comprising a tube member having a first set of threads at a first end of the tube member and a second set of threads at a second end of the tube member; a first clevis coupling assembly comprising a first width dimension and a third set of threads compatible for engaging the first set of threads of the tube member wherein the first clevis coupling assembly has a second width dimension extending across the first clevis coupling assembly which includes a portion of the third set of threads wherein the second width dimension is greater than the first width dimension; a second clevis coupling assembly comprising a third width dimension and a fourth set of threads compatible for engaging the second set of threads of the tube member wherein the second clevis coupling assembly has a fourth width dimension extending across the second clevis coupling assembly which includes a portion of the fourth set of threads, wherein the fourth width dimension is greater than the third width dimension.

The features, functions, and advantages that have been discussed can be achieved independently in various examples or may be combined in yet other examples further details of which can be seen with reference to the following description and drawings.

BRIEF SUMMARY OF THE DRAWINGS

FIG. 4A is an enlarged cross section view as seen encircled and designated as 4A in

FIG. 3;

DESCRIPTION

Figure 1:
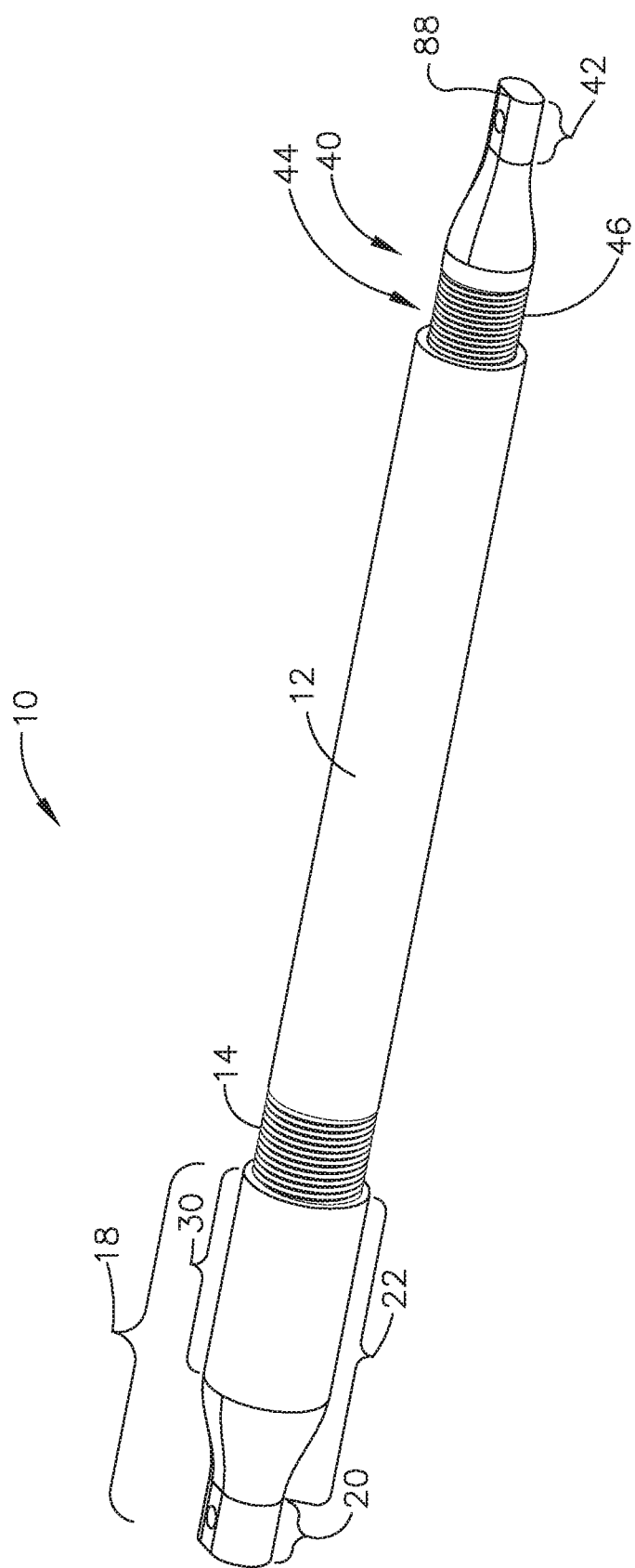
FIG. 1 is a perspective of a tie-rod assembly.

As noted above, many tie-rods of different particular lengths are fabricated to address the various length requirements needed in the construction of the aircraft, however, having to produce numerous tie rod assemblies of different lengths requires incurring significant engineering design and fabrication costs. As a result, there is a need to produce a smaller number of tie-rod assemblies which are adjustable in length to accommodate different length ranges of application and thereby reduce design and fabrication costs associated with production of numerous tie-rod assemblies which have different specific lengths or has limited adjustability with respect to the length. A reduction in the number of tie-rod assemblies of different lengths would lower engineering design, fabrication, material and inventory costs to counter increase in aircraft operational cost associated with use of an adjustable tie-rod assembly. As a result, in providing adjustability in length of the tie-rod assemblies there is an interest in reducing the weight contribution of the adjustable tie-rod assembly.

Tie-rod assemblies are generally used, as mentioned earlier, as tension devices but are also required under certain regulatory requirements to handle certain compression load demands in order to be qualified for use within, for example, the construction of a particular aircraft. In order to meet these compression load demand requirements, tie-rod assemblies typically utilize a larger diameter of tube in the middle section, which effectively counters the effects of compression buckling. However, at the ends of the tie-rod assemblies, both the primary and secondary attachments are subject to space limitations, which requires that the tie-rod width taper down to a smaller dimension at the ends. The smaller dimensions result in lower strength at the tie-rod ends, especially in the threaded section and to counter this strength deficiency stronger heavier materials such as steel has been employed for the tie-rod ends. As a result, there is also a need to reduce the weight contribution to an operational aircraft with elimination of use of materials with a high density such as steel in the construction of the tie-rod assembly so as to lighten the weight demand placed on the aircraft and still meet the regulatory compression load demand requirements with the tie rod at the maximum length extension.

The use of steel for tie-rod ends also results in higher manufacturing costs and there is a need to reduce the cost of parts by use of materials with lower manufacturing costs such as for example aluminum.

To accommodate airplane manufacturing tolerances, there is a requirement for fine length adjustment of tie-rod assemblies. This is typically achieved by the use of threaded tie-rod ends and turning the tie-rod assembly to achieve the required length. However, use of the threaded tie rod ends as a means of large length adjustment is typically not practical because the rod ends at maximum length extension results in unfavorable geometry that creates high stresses in the small diameter of the threaded portion under compression loads. As a result, there is a need for both fine length adjustment to accommodate manufacturing tolerance and large length adjustment to accommodate different installation connection configurations and there is a need for tie-rod assemblies to achieve both these adjustment requirements with the minimum number of internal parts in order to minimize cost.

Figure 2:
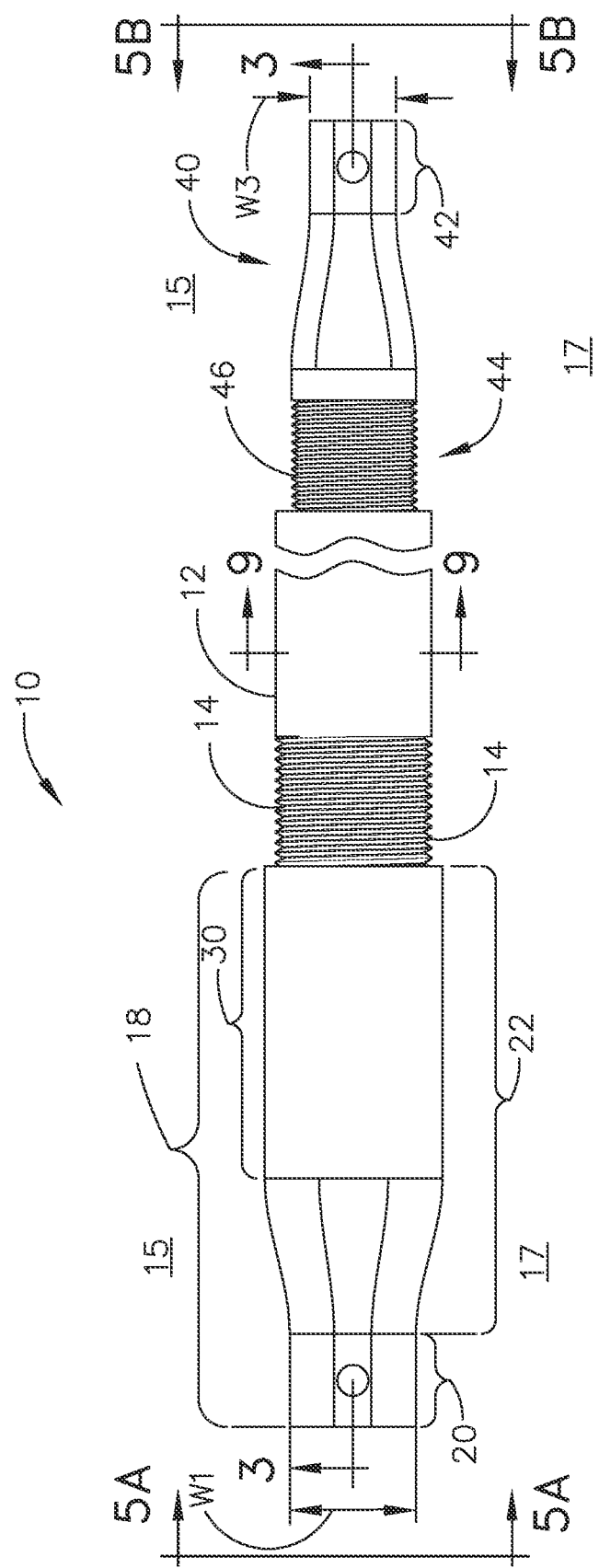
FIG. 2 is a partial top plan view of the tie-rod assembly of FIG.1.
Figure 3:
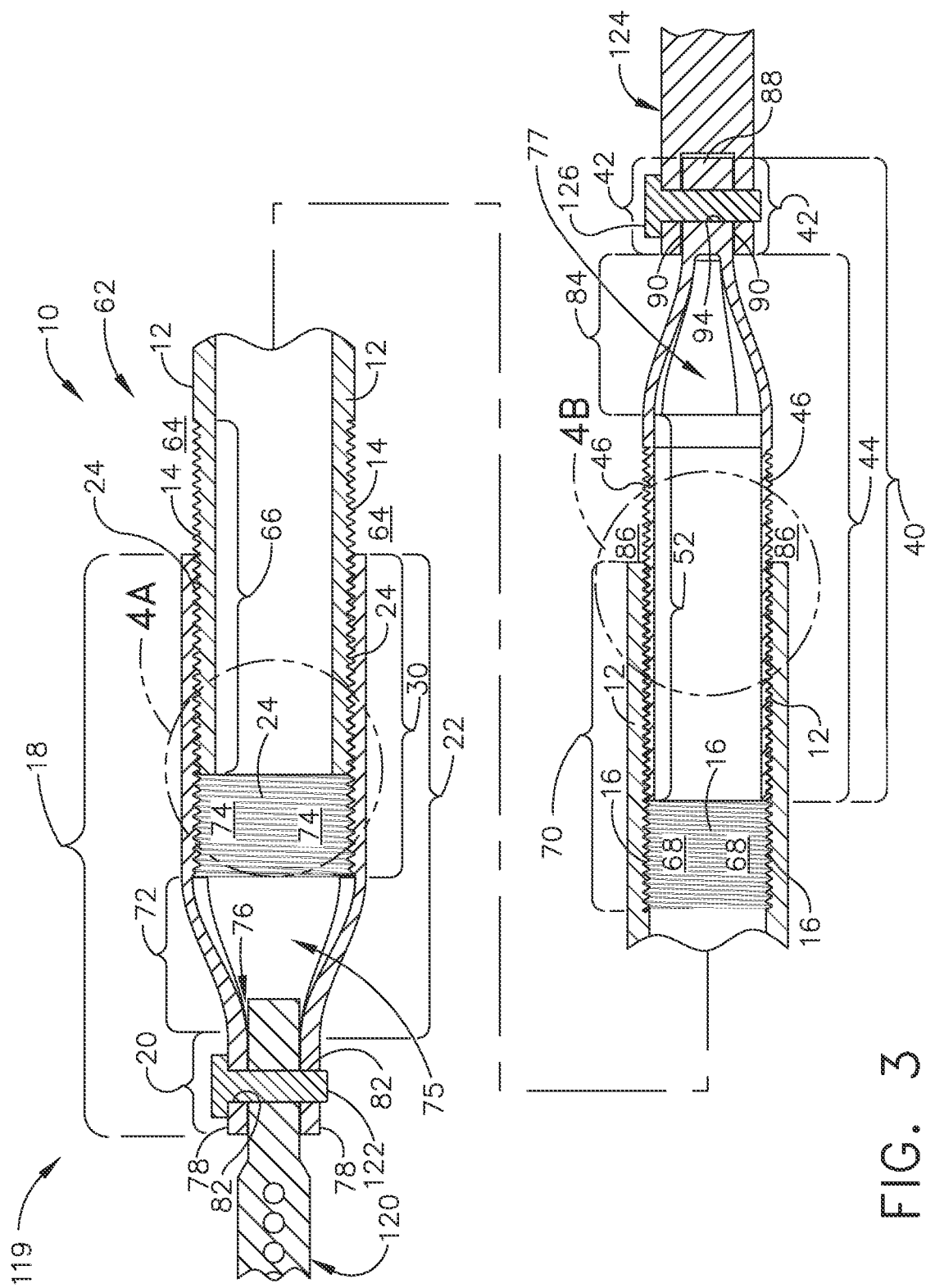
FIG. 3 is a partial cross section view as seen along line 3-3 of FIG, 2 and showing a tie-rod assembly system.

In referring to FIGS. 1-5B, tie-rod assembly 10 includes tube member 12, which has first set of threads 14 at first end 66 of tube member 12 and has second set of threads 16 at second end 70 of tube member 12, as seen in FIG. 3. Tie-rod assembly 10 further includes first clevis coupling assembly 18 which includes, in this example, first lug assembly 20 having a first width dimension W1, as seen in FIGS. 2 and 5A, which extends across first lug assembly 20 from one side 15 of tie-rod assembly 10 to an opposing second side 17 of tie-rod assembly 10, extending between outermost surface 81 of first lug assembly 20 positioned on one side 15 of tie-rod assembly 10 and outermost surface 81 of first lug assembly 20 positioned on the opposing second side 17 of tie-rod assembly 10. First coupling assembly 22 is connected to first lug assembly 20. First coupling assembly 22 of first clevis coupling assembly 18 has third set of threads 24 which extends around the first coupling assembly 22 and is compatible for engaging first set of threads 14 of tube member 12. First coupling assembly 22 of first clevis coupling assembly 18, has a second width dimension W2 extending across first coupling assembly 22 of first clevis coupling assembly 18, as seen for example in FIG. 4A, which includes a portion of third set of threads 24 wherein second width dimension W2 is greater than first width dimension W1, as seen in FIG. 2. With first set of threads 14 and third set of threads 24 being compatible with one another, first clevis coupling assembly 18 is adjustable along tube member 12.

This increase of first width dimension from W1 of first lug assembly 20 to second width dimension W2 of first coupling assembly 22 provides for an increase in moment of inertia of bending resistance with respect an application of a compression force applied to tie-rod assembly 10 through first lug assembly 20 to tube member 12. The compression force load introduced to tie rod assembly 10 through first lug assembly 20 has first width dimension W1. First lug assembly 20 transfers the load to first coupling assembly 22 of first coupling assembly 22 of first clevis coupling assembly 18 through third set of threads 24 to first set of threads 24, wherein a portion of the third set of threads 24 is included within the greater second width dimension W2. This configuration provides load distribution from first width dimension W1 to second width dimension W2 thereby providing tie-rod assembly 10 an enhanced moment of inertia for bending resistance to compression loading and provides greater bending resistance for tie-rod assembly 10 from collapsing from such compression loads.

With this more stable configuration for tie rod assembly 10 for confronting compression loadings, the fabricator can utilize a lighter and less dense material for fabricating tie rod assembly 10, which otherwise would not be available to be used in order to meet compression load performance requirements. Tie-rod assembly 10 can, for example, now be fabricated from a material such as aluminum instead of more dense and thereby heavier material such as steel. As a result, tie-rod assembly 10 thereby applies less weight demand on an operational aircraft being fabricated with tie rod assembly 10 and at the same time being able to fulfill compression load performance requirements. In addition, fabricating tie-rod assembly 10 from material such as aluminum eliminates the high cost fabrication associated with materials such as steel. With this additional stability, greater length adjustability can also be provided along engaging threads in tie rod assembly 10 and thereby reduce the number of different tie rod assembly part lengths needed in fabricating an assembly such as an aircraft and thereby reduce the engineering and material costs associated with carrying a wider variety of lengths of tie rod assemblies.

Figure 4A:
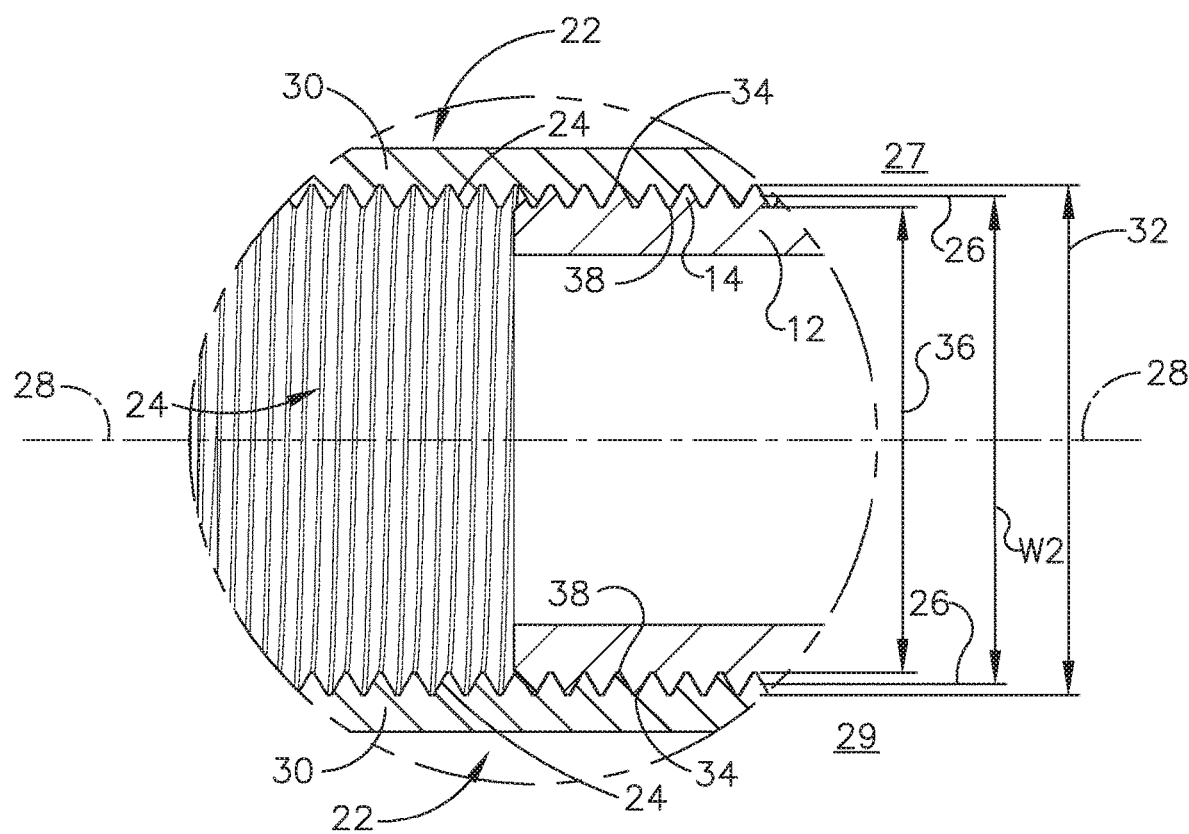

An example of second width dimension W2 associated with third set of threads 24, is shown in FIG. 4A. Third set of threads 24 define first pitch diameter 26 which extends through third set of threads 24 and is positioned about axis 28 of the first coupling assembly 22. First pitch diameter 26 is a component in determining the compatibility between internally and externally threaded parts. A pitch diameter refers to a width of a geometric cylinder which is co-axial with, in this example, first cylindrical wall portion 30 of first coupling assembly 22, and the cylinder intersects major diameter 32, which is aligned with root 34 of an internal thread such as threads of third set of threads 24 as seen in FIG. 4A and minor diameter 36, which is aligned with crest 38 of an internal thread of third set of threads 24. Second width dimension W2, as seen in FIG. 4A, which extends from first pitch diameter 26 on first side 27 of first coupling assembly 22, through axis 28 of first coupling assembly 22 and to first pitch diameter 26 positioned on second opposing side 29 of first coupling assembly 22, is greater than first width dimension W1 of first lug assembly 20.

Figure 4B:
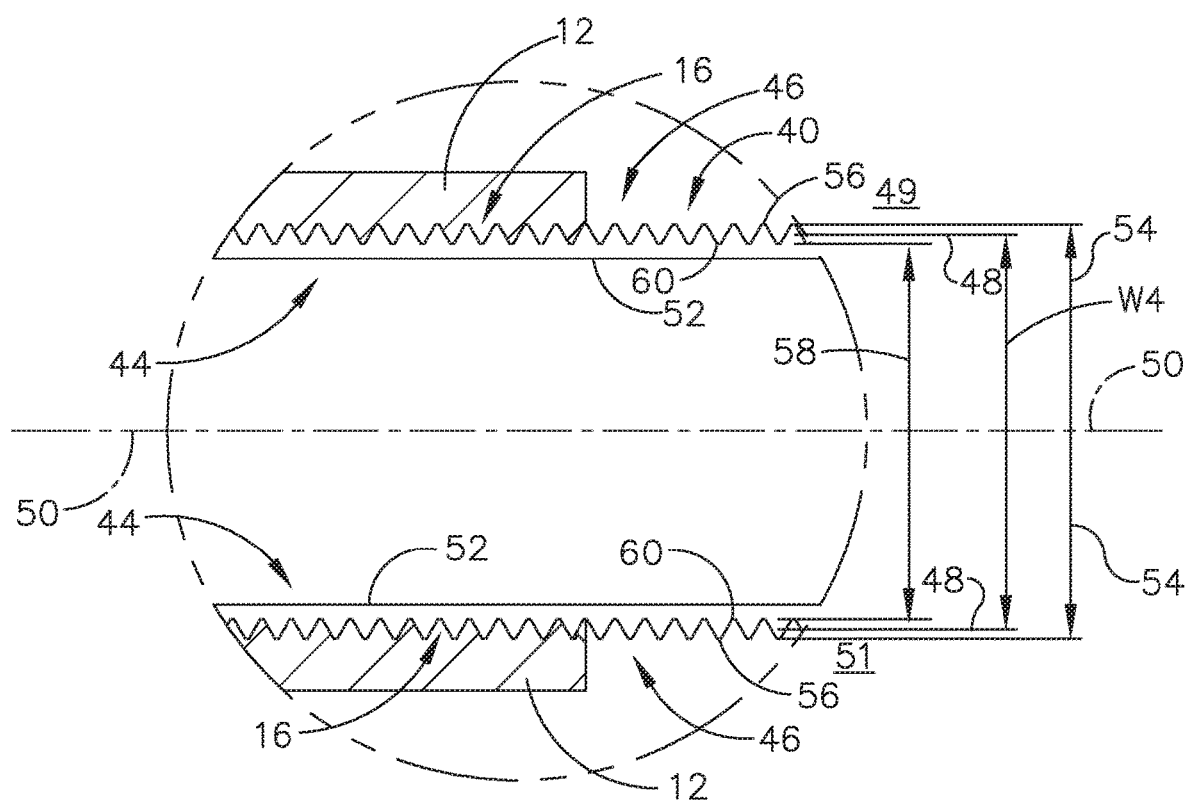
FIG. 4B is an enlarged cross section view as seen encircled and designated as 4B in FIG. 3.
Figure 5A:
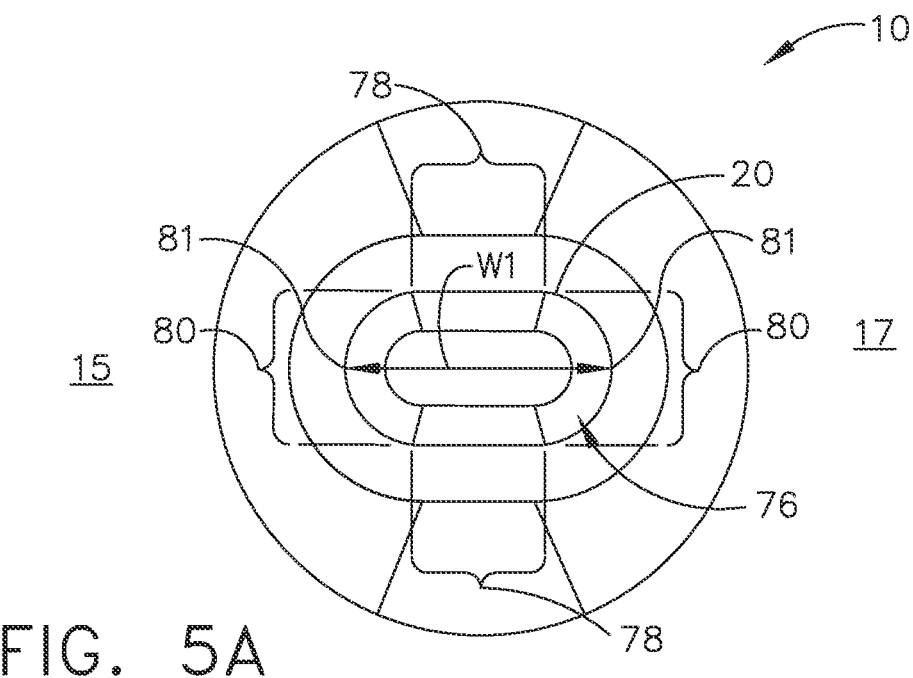
FIG. 5A is an end view of first lug assembly as seen from line 5A-5A in FIG. 2.
Figure 5B:
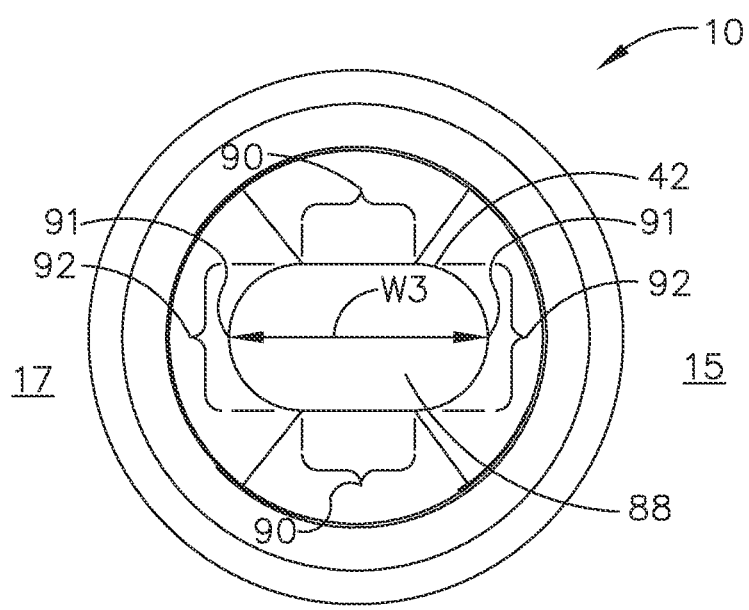
FIG. 5B is an end view of the second lug assembly as seen from line 5B-5B in FIG. 2.

Tie-rod assembly 10 further includes second clevis coupling assembly 40, as seen in FIG. 3, which includes, in this example, second lug assembly 42 having third width dimension W3, as seen in FIGS. 2 and 5B, which extends across second lug assembly 42 from one side 15 of tie-rod assembly 10 to the opposing second side 17 of tie-rod assembly 10, extending between outermost surface 91 of second lug assembly 42 positioned on one side 15 of tie-rod assembly 10 and outermost surface 91 of second lug assembly 42 positioned on the opposing second side 17 of tie-rod assembly 10. Second coupling assembly 44 is connected to the second lug assembly 42. Second coupling assembly 44 of second clevis coupling assembly 40 has fourth set of threads 46 which extends around second coupling assembly 44, which is compatible for engaging second set of threads 16 of tube member 12. Second coupling assembly 44 of second clevis coupling assembly 40 has fourth width dimension W4 extending across second coupling assembly 44, as seen for example in FIG. 4B, which includes a portion of fourth set of threads 46 wherein fourth width dimension W4 is greater than third width dimension W3, as seen in FIG. 2. With second set of threads 16 and fourth set of threads 46 being compatible with one another, second clevis coupling assembly 40 is adjustable along tube member 12. This greater dimension of fourth width dimension W4 relative to third width dimension W3 provides the benefits of greater moment of inertia bending resistance for tie-rod assembly 10 to compression loadings applied to tie rod assembly 10 through, in this example, second lug assembly 42 as similarly discussed above with respect to first width dimension W1 and second width dimension W2 with respect to compression loadings applied to tie rod assembly through first lug assembly 20.

An example of fourth width dimension W4 associated with fourth set of threads 46, is shown in FIG. 4B. Fourth set of threads 46 defines second pitch diameter 48 which extends through fourth set of threads 46 and is positioned about axis 50 of second coupling assembly 44. Second pitch diameter 48 is a component in determining the compatibility between internally and externally threaded parts. A pitch diameter, as mentioned above, refers to a width of a geometric cylinder which is co-axial with, in this example, second cylindrical wall portion 52 of second coupling assembly 44, as seen in FIG. 4B, and the cylinder intersects major diameter 54, which is aligned with crest 56 of an external thread such as threads of fourth set of threads 46 in FIG. 4B and minor diameter 58, which is aligned with root 60 of an external thread of fourth set of threads 46. Fourth width dimension W4, which extends from second pitch diameter 48 on first side 49 of second coupling assembly 44, through axis 50 of second coupling assembly 44 and to second pitch diameter 48 positioned on second opposing side 51 of second coupling assembly 44, is greater than the third width dimension W3 of second lug assembly 42.

In referring to FIG. 3, first example 62 of tie-rod assembly 10 includes first set of threads 14 defined within external side 64 of first end 66 of tube member 12 and second set of threads 16 are defined within internal side 68 of second end 70 of tube member 12. First coupling assembly 22 includes first cylindrical wall portion 30 with a first transition wall member 72 which connects first cylindrical wall portion 30 to first lug assembly 20. First transition wall member 72 forms opening 75, as seen in FIG. 3, which extends through first transition wall member 72. Third set of threads 24 are defined in internal side 74 of first cylindrical wall portion 30. First lug assembly 20 includes first wall enclosure 76 which defines two spaced apart planar wall portions 78 and two spaced apart curved wall portions 80, as seen in FIG. 5A. Aligned bores 82 are defined through two spaced apart planar wall portions 78, as seen in FIG. 3, which provide for facilitating connecting of tie-rod assembly 10 with for example a fastener such as for example a bolt to secure to, in this example, a structure within an aircraft.

First example 62 of tie-rod assembly 10 further includes second coupling assembly 44 of FIG. 3 including second cylindrical wall portion 52 with second transition wall member 84 which connects second cylindrical wall portion 52 to second lug assembly 42. Second transition wall member 84 forms opening 77, as seen in FIG. 3, which extends through second transition wall member 84. Fourth set of threads 46 are defined in an external side 86 of second cylindrical wall portion 52. Second lug assembly 42 includes wall member 88, which extends from second transition wall member 84 and defines two planar sides 90 and two curved sides 92, as seen in FIG. 5B. Bore 94 defined extending through wall member 88 and two planar sides 90, as seen in FIG. 3, provides for facilitating connecting of tie rod assembly 10 with for example a fastener such as for example a bolt to secure to, in this example, a structure within an aircraft.

Figure 6:
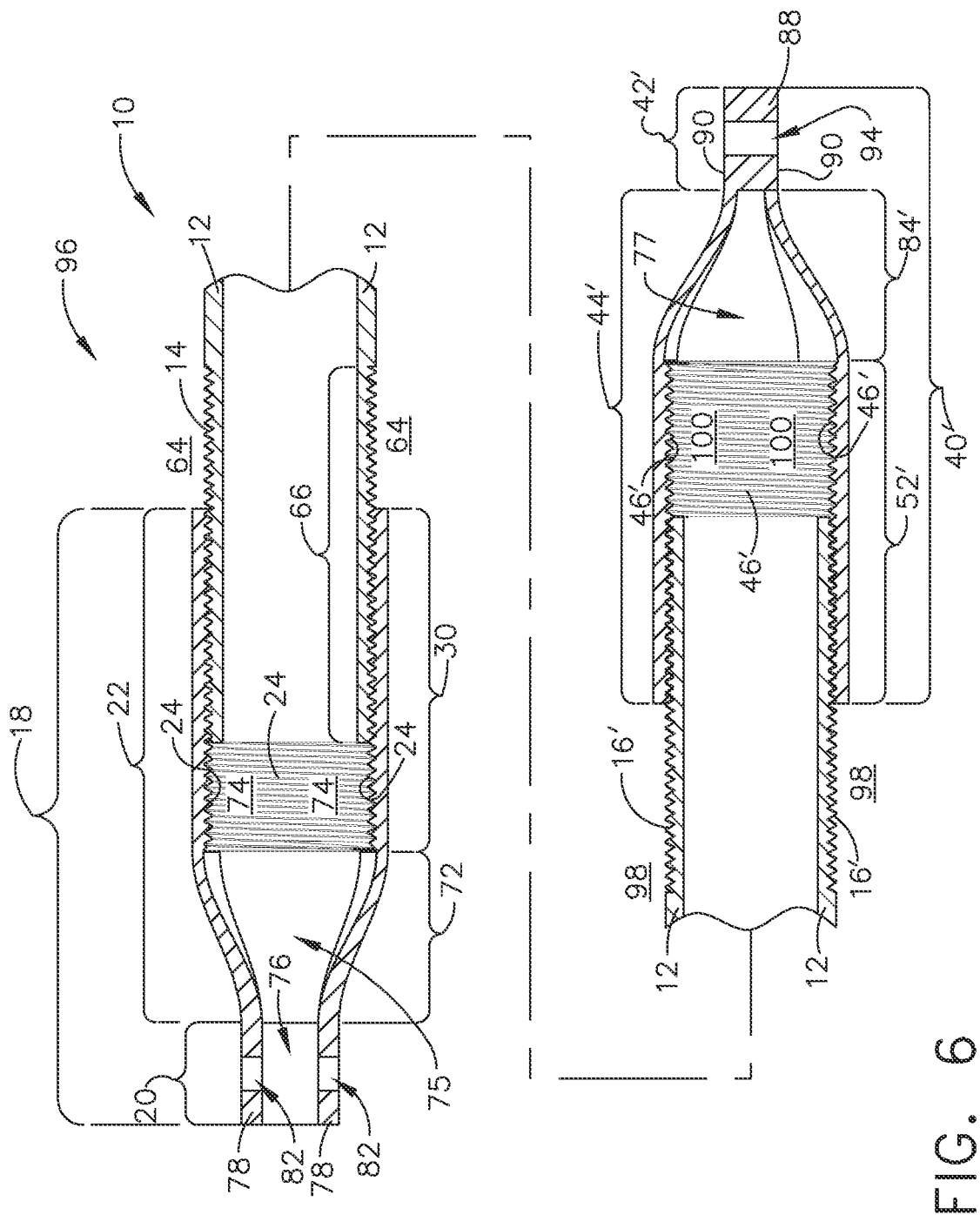
FIG. 6 is a partial cross section view as seen along line 3-3 of FIG. 2 of a second example of the tie-rod assembly.

In referring to FIG. 6, second example 96 of tie-rod assembly 10 includes first set of threads 14 defined within external side 64 of first end 66 of tube member 12 and second set of threads 16' are defined within external side 98 of a second end 70 of tube member 12. First coupling assembly 22 includes first cylindrical wall portion 30 with first transition wall member 72 which connects first cylindrical wall portion 30 to first lug assembly 20. Third set of threads 24 are defined in internal side 74 of the first cylindrical wall portion 30. First lug assembly 20 includes first wall enclosure 76 which defines two spaced apart planar wall portions 78 and two spaced apart curved wall portions 80, as seen in FIG. 5A, with aligned bores 82, as seen in FIG. 3, defined through two spaced apart planar wall portions 78. This construction of tube member 12 engaging with first clevis coupling assembly 18, as seen in FIG. 6, is similarly constructed as described above for first example 62 shown in FIG. 3 wherein first coupling assembly engages tube member 12 on the outside of tube member 12.

Second example 96 of tie-rod assembly 10 further includes second coupling assembly 44' which includes second cylindrical wall portion 52' with a second transition wall member 84' which connects second cylindrical wall portion 52' to second lug assembly 42'. Fourth set of threads 46' are defined within internal side 100 of second cylindrical wall portion 52'. Second lug assembly 42' includes wall member 88 which extends from second transition wall member 84' and defines two planar sides 90 and two curved sides 92, as seen in FIG. 5B. Bore 94 is defined extending through wall member 88 and two planar sides 90 which provides for facilitating connecting of tie-rod assembly 10 with application of, for example, a bolt to a secondary structure of an aircraft. This construction of tube member 12 engaging with second clevis coupling assembly 18', as seen in FIG. 6, is similarly constructed as described above for first example 62 shown in FIG. 3 except second clevis coupling assembly 40' of second example 96 engages tube member 12 on the outside of tube member 12.

Figure 7:
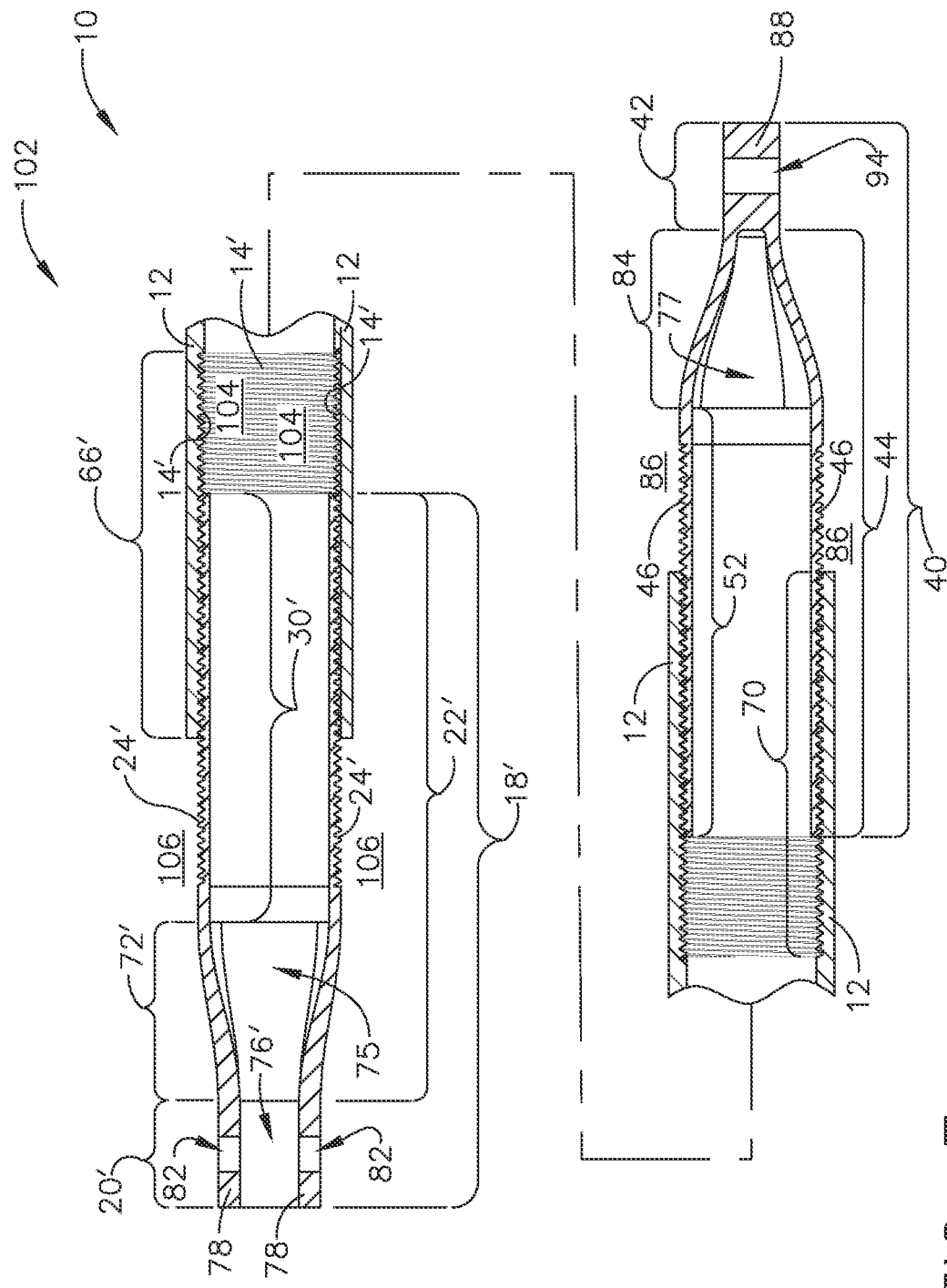
FIG. 7 is a partial cross section view as seen along line 3-3 of FIG. 2 of a third example of the tie-rod assembly.

In referring to FIG. 7, third example 102 of tie-rod assembly 10 includes first set of threads 14' are defined within internal side 104 of first end 66' of tube member 12 and second set of threads 16 are defined within internal side 68 of second end 70 of tube member 12. First coupling assembly 22' includes first cylindrical wall portion 30' having first transition wall member 72' which connects first cylindrical wall portion 30' to first lug assembly 20'. Third set of threads are defined in external side 106 of first cylindrical wall portion 30'. First lug assembly 20' includes first wall enclosure 76' which defines two spaced apart planar wall portions 78 and two spaced apart curved wall portions 80 as seen in FIG. 5A with aligned bores 82 defined through two spaced apart planar wall portions 78, as seen in FIG. 3. This construction of tube member 12 engaging with second clevis coupling assembly 18', as seen in FIG. 7, is similarly constructed as described above for first example 62 shown in FIG. 3, except first clevis coupling assembly 18' engages tube member 12 on the inside of tube member 12.

Third example 102 of tie-rod assembly 10 further includes second coupling assembly 44 which includes second cylindrical wall portion 52 with second transition wall member 84 which connects second cylindrical wall portion 52 to second lug assembly 42. Fourth set of threads 46 are defined within external side 86 of second cylindrical wall portion 52. Second lug assembly 42 includes wall member 88 which extends from second transition wall member 84 and defines two planar sides 90 and two curved sides 92, as seen in FIG. 5B, with a bore 94 defined extending through wall member 88 and two planar sides 90. This configuration of second clevis coupling assembly 40 with tube member 12 is similar to the configuration of second clevis coupling assembly 40 with tube member 12 of first example 62 of tie-rod assembly 10 of FIG. 3.

Figure 8:
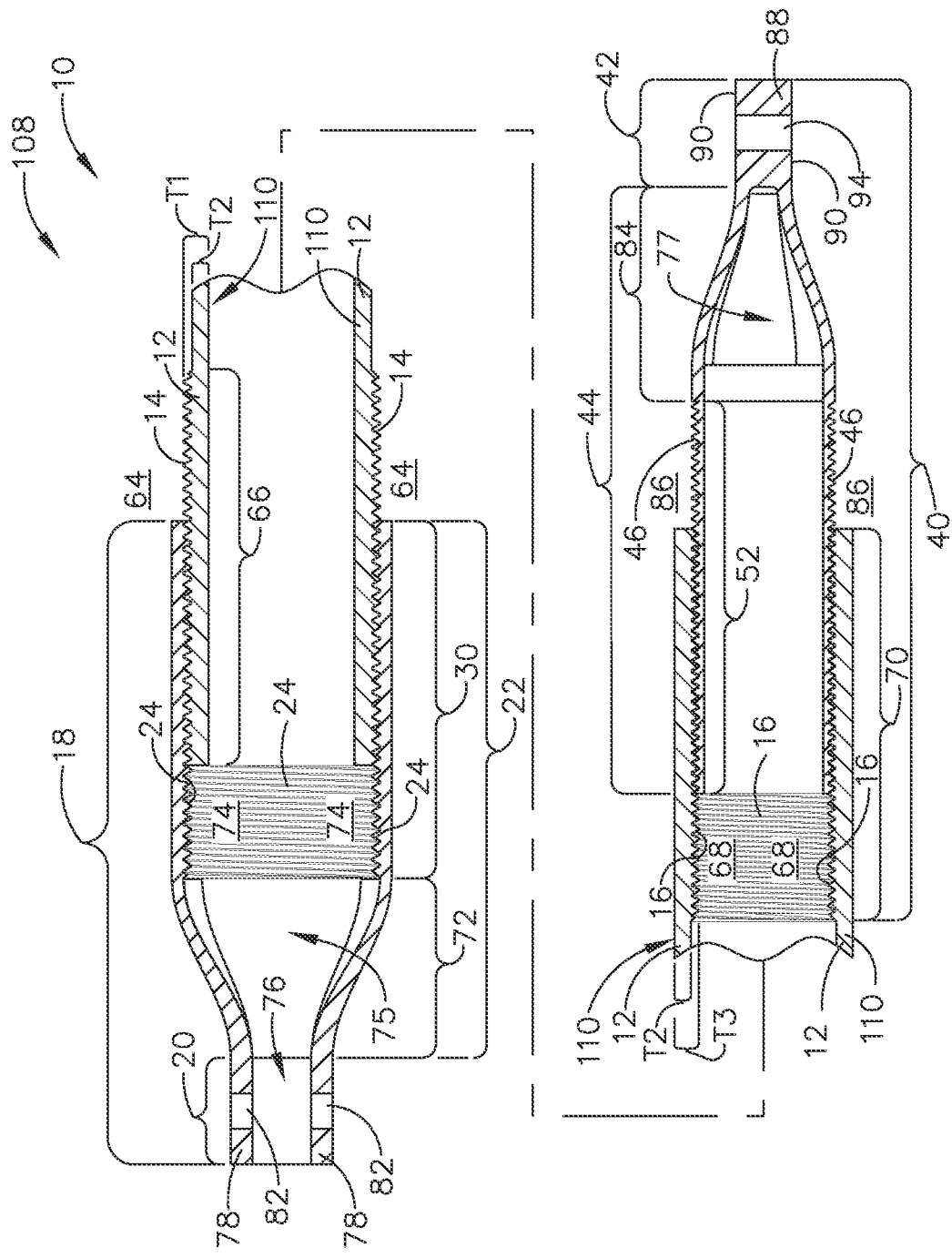
FIG. 8 is a partial cross section view as seen along line 3-3 of FIG. 2 of a fourth example of the tie-rod assembly.

In referring to FIG. 8, fourth example 108 of tie-rod assembly 10 includes first set of threads 14 are defined within external side 64 of first end 66 of tube member 12 and second set of threads 16 are defined within internal side 68 of second end 70 of tube member 12. This configuration for fourth example 108 is similar to the configuration for first example 62 except for ends of tube member 12 will have thicker wall thickness dimension than a central portion of tube member 12 as will be described. The thicker ends as will also be described herein are formed with swaging tube member 12 and positioning ends of tube member 12 to have thicker wall dimension than a central portion of tube member 12.

First end 66 of tube member 12 has first wall thickness dimension T1 greater than wall thickness dimension T2 of central portion 110 of tube member 12, which is positioned between first end 66 and second end 70 of tube member 12. Second end 70 has a second wall thickness dimension T3 greater than wall thickness T2 of central portion 110 of tube member 12. In this example, first wall thickness dimension T1 and second wall thickness dimension T3 are similar in dimension. This construction can provide a stronger connection between first and second clevis coupling assemblies 18 and 40 and tube member 12. Should pitch diameter, for example, be increased with the increased thickness dimension then an increase of moment of inertia bending resistance for compression bending resistance at an end of the tie-rod assembly can also be experienced. Improvement of moment of inertia bending resistance to compression loading provides benefits, as mentioned earlier, in being able to use lighter less dense material to construct tie-rod assembly 10 and provides having additional adjustable length of a particular tie rod so as to be able to reduce the number of tie-rod assemblies 10 needed to accommodate various length demands in the fabrication of, for example, an aircraft. In addition with swaging tube member 12, central portion 110 of tube member 12 has a thinner wall construction in central portion 110 of tie-rod assembly 10 with the reduction of the material in central portion 110 being moved to provide additional wall thickness in end portions of the tie rod assembly, resulting in tie-rod assembly 10 not adding additional weight demand to an operational aircraft.

First coupling assembly 22 includes first cylindrical wall portion 30 with first transition wall member 72 connecting first cylindrical wall portion 30 to first lug assembly 20. Third set of threads 24 are defined within internal side 74 of first cylindrical wall portion 30. First lug assembly 20 includes first wall enclosure 76 which defines two spaced apart planar wall portions 78 and two spaced apart curved wall portions 80, as seen in FIG. 5A, with aligned bores 82 defined through the two spaced apart planar wall portions 78, as seen in FIG. 8. As mentioned earlier, this configuration of first lug assembly 20 facilitates securement of tie rod assembly 10 to a structure within the aircraft.

Second coupling assembly 44 includes second cylindrical wall portion 52 with second transition wall member 84 connecting second cylindrical wall portion 52 portion to second lug assembly 42. Fourth set of threads 46 are defined in external side 86 of second cylindrical wall portion 52. Second lug assembly 42 includes wall member 88, which extends from second transition wall member 84 and defines two planar sides 90 and two curved sides 92, as seen in FIG. 5B, with bore 94 defined extending through wall member 88 and two planar sides 90, as seen in FIG. 8. This second lug assembly 42 facilitates securing tie rod assembly 10 to a structure within the aircraft.

To facilitate ease in installation and adjustment of tie-rod assembly 10, in this example, first set of threads 14 of tube member 12 are turned such that first set of threads 14 are one of a right hand thread or a left hand thread orientation and second set of threads 16 are the other one of the right hand thread or the left hand thread orientation of the first set of threads 14. With threads on opposing ends of tube member 12 turned opposite to one another, the installer can engage first set of threads 14 with third set of threads 24 of first coupling assembly 22 and engage second set of threads 16 with fourth set of threads 46 of second coupling assembly 44. With tube member 12 engaged to first and second coupling assemblies 22, 44, installer can grasp tube member 12 and can turn tube member in one direction to lengthen tie rod assembly 10 and in an opposite direction to shorten tie-rod assembly 10. In addition, tube member 12, first clevis coupling assembly 18 and the second clevis coupling assembly 40, as discussed earlier, based on the improved moment of inertia compression bending resistance, can be constructed of lighter less dense material than that of steel. In this example, the construction of tube member, 12, first and second clevis coupling assemblies 18, 40 can be constructed of aluminum or other suitable material having less density than steel.

Figure 9:
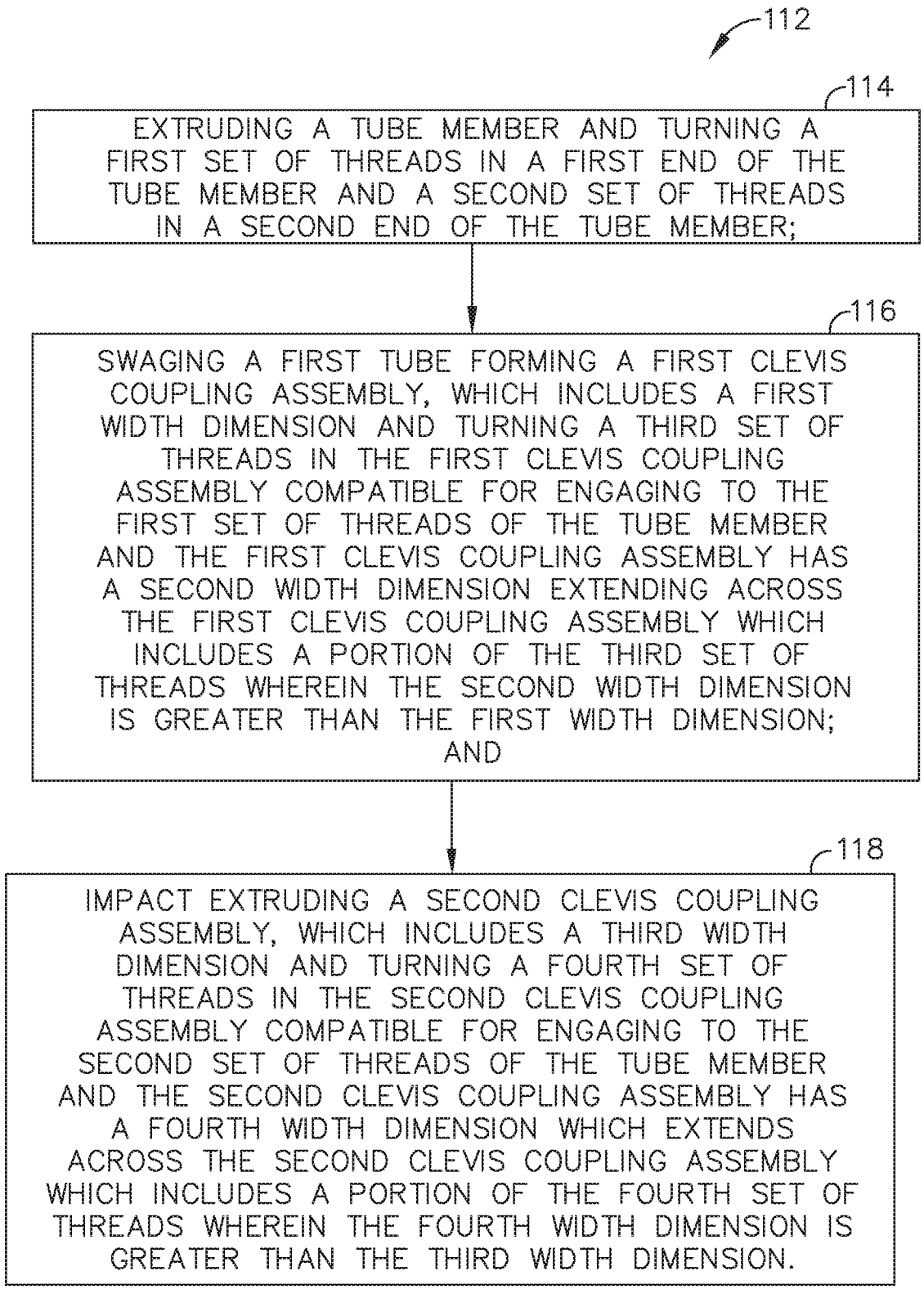
FIG. 9 is a flow chart of a method for fabricating a tie-rod assembly.

In referring to FIG. 9, method 112 for fabricating tie rod assembly 10 includes extruding 114 tube member 12 and turning a first set of threads 14 at first end 66 in tube member 12 and a second set of threads 16 at second end 70 in tube member 12. Method 112 further includes swaging 116 a first tube (not shown) forming first clevis coupling assembly 18, which, in this example, includes first lug assembly 20, which has a first width dimension W1. In this example, first coupling assembly 22 is connected to first lug assembly 20. Swaging 116 further includes turning a third set of threads 24 in the first coupling assembly 22 of first clevis coupling assembly 18 which extends around first coupling assembly 22 and is compatible for engaging to first set of threads 14 of tube member 12. First coupling assembly 22 of first clevis coupling assembly 18 has second width dimension W2 extending across first coupling assembly 22 which includes a portion of third set of threads 24 wherein second width dimension W2 is greater than first width dimension W1. Swaging enables the thickness of the planar portions 78 and cylindrical wall portion 30 to be controlled exactly and optimized to meet the specific strength requirements. Furthermore, the thickness of first transition wall member 72 can vary continuously and be optimized to match the continuously varying load requirements along the length of first transition wall member 72.

Method 112 further includes impact extruding 118 second clevis coupling assembly 40, which includes, in this example, second lug assembly 42 including wall member 88 having third width dimension W3 and second coupling assembly 44 connected to second lug assembly 42. Further included in method 112 is turning fourth set of threads 46 in second coupling assembly 44 of second clevis coupling assembly 40. Fourth set of threads 46 in second coupling assembly 44, which extends around second coupling assembly 44, is compatible for engaging to second set of threads 16 of tube member 12. Second coupling assembly 44 of second clevis coupling assembly 40 has a fourth width dimension W4 which extends across second coupling assembly 44 of second clevis coupling assembly 40 which includes a portion of fourth set of threads 46 wherein fourth width dimension W4 is greater than third width dimension W3. Impact extruding 118 enables the thickness of wall member 88 and second cylindrical wall portion 52 to be controlled exactly and optimized to meet the specific strength requirements and furthermore the thickness of second transition wall member 84 can vary continuously and be optimized to match the continuously varying load requirements along the length of second transition wall member 84. Thicknesses of the walls of member 88, second transition wall member 84 and second cylindrical wall portion 52 can be selectively varied in thickness as needed with the step of impact extruding 118. As mentioned earlier in the example shown in FIG. 4A, third set of threads 24 defines first pitch diameter 26 which extends through third set of threads 24 and is positioned about axis 28 of first coupling assembly 22. Second width dimension W2 in this example, extends from first pitch diameter 26 on a first side 27 of first coupling assembly 22, through axis 28 of first coupling assembly 22 and to first pitch diameter 26 positioned on second opposing side 29 of first coupling assembly 22. Second width dimension W2 is greater than first width dimension W1 as described earlier.

Fourth set of threads 46, as seen in FIG. 4B, defines second pitch diameter 48 which extends through fourth set of threads 46 and is positioned about axis 50 of second coupling assembly 44. Fourth width dimension W4, which extends from second pitch diameter 48 of first side 49 of second coupling assembly 44, through axis 50 of second coupling assembly 44 and to second pitch diameter 48 positioned on second opposing side 51 of second coupling assembly 44. Fourth width dimension W4 is greater than third width dimension W3 as also described earlier.

As also described earlier an example can include first set of threads 14 is one of a right hand thread or a left hand thread and second set of threads 16 is the other of the one of the right hand thread or left hand thread of first set of threads 14. This configuration provides ease to the installer in being able to grasp tube member 12 and turn tube member 12 one direction to lengthen tie-rod assembly 10 that has been engaged to first and second clevis coupling assemblies 18, 40 and be able to turn tube member 12 in an opposite direction to shorten tie rod assembly 10.

Method 112 further includes boring aligned bores 82 through two spaced apart planar wall portions 78 of first lug assembly 20 and further includes boring bore 94 through wall member 88 of second lug assembly 42. Positioning aligned bores 82 and bore 94 in first lug assembly 20 and second lug assembly 42, respectively, facilitates the securement of tie-rod assembly 10 to structures within a structure such as an aircraft so as to provide tension load support and to provide required compression load requirements.

Method for fabricating tie-rod assembly 10 further includes swaging tube member 12 such that first end 66 of tube member 12 has first wall thickness dimension T1, as earlier described, which is greater than second wall thickness T2 of central portion 110 of tube member 12 positioned between first end 66 and second end 70 of tube member 12. Second end 70 of tube member 12 has third wall thickness T3 greater than wall thickness T2 of central portion 110 of tube member 12, wherein first set of threads 14 is positioned in first end 66 of tube member 12 and second set of threads 16 is positioned in second end 70 of tube member 12. Varying thicknesses for each of first end 66, second end 70 and central portion 110 of tube member 12 can be selectively provided by swaging tube member 12 as well as providing tapering of thicknesses as selectively needed as well.

In referring to FIG. 3, system 119 can be seen which includes tube member 12 having first set of threads 14 at a first end 66 of tube member 12 and second set of threads 16 at second end 70 of tube member 12. System 119 further includes first clevis coupling assembly 18 which includes a first width dimension W1 as seen in FIG. 2. First clevis coupling assembly 18 further includes third set of threads 24, as seen in FIG. 3 compatible for engaging first set of threads 14 of tube member 12 wherein first clevis coupling assembly 18 has second width dimension W2 extending across first clevis coupling assembly 18 and includes a portion of the third set of threads 24, as seen in FIG. 4A, wherein second width dimension W2 is greater than first width dimension W1. System 119 further includes second clevis coupling assembly 40 includes third width dimension W3, as seen in FIG. 2. Fourth set of threads 46 are compatible for engaging second set of threads 16 of tube member 12 wherein the second clevis coupling assembly 40 has fourth width dimension W4 extending across the second clevis coupling assembly 40 which includes a portion of fourth set of threads 46, as seen in FIG. 4B. System 119 further includes fourth width dimension W4 is greater than the third width dimension W3. This configuration as discussed earlier provides for the enhanced moment of inertia resistance to compression loading on tie-rod assembly 10.

System 119 further includes first clevis coupling assembly 18 being secured to first structure 120, which in this example as seen in FIG. 3, is a primary support structure being secured to first clevis coupling assembly 18 with fastener 122. First clevis coupling assembly 18 can be selectively secured to a primary or secondary support structure. Second clevis coupling assembly 40 is shown in FIG. 3 secured to second structure 124, which in this example as seen in FIG. 3, is a secondary support structure being secured to second clevis coupling assembly 40 with fastener 126. Second clevis coupling assembly 40 can be selectively secured to a primary or secondary support structure. System 119 provides tension loading support and fulfills compression loading requirements as required in fabrication, for example, of an aircraft.

While various examples have been described above, this disclosure is not intended to be limited thereto. Variations can be made to the disclosed examples that are still within the scope of the appended claims.

What is claimed:

1. A tie-rod assembly, comprising:
   a tube member having a cylindrical wall configuration with a first set of threads defined in and which extend along the cylindrical wall configuration at a first end of the tube member and a second set of threads defined in and which extend along the cylindrical wall configuration at a second end of the tube member;
   a first clevis coupling assembly, comprising:
      a first cylindrical wall portion connected to a first transition wall member, which extends from the first cylindrical wall portion and forms an opening through the first transition wall member, wherein the first transition wall member connects a first lug assembly to the first cylindrical wall portion; and the first lug assembly has a first width dimension, which extends across the first lug assembly from an one side of the tie-rod assembly to an opposing second side of the tie-rod assembly and between an outermost surface of the first lug assembly positioned on the one side of the tie-rod assembly and an outermost surface of the first lug assembly positioned on the opposing second side of the tie-rod assembly, wherein:
 the first cylindrical wall portion has a third set of threads defined in and which extend along the first cylindrical wall portion, which are compatible for engaging the first set of threads of the tube member;
 the first cylindrical wall portion of the first clevis coupling assembly has a second width dimension, which extends across the first cylindrical wall portion and through an axial axis of the first cylindrical wall portion of the first clevis coupling assembly; and
 the second width dimension includes a portion of the third set of threads such that the second width dimension is greater than the first width dimension of the first lug assembly; and
a second clevis coupling assembly, comprising:
 a second cylindrical wall portion connected to a second transition wall member, which extends from the second cylindrical wall portion and forms an opening through the second transition wall member, wherein the second transition wall member connects a second lug assembly to the second cylindrical wall portion; and
 the second lug assembly has a third width dimension, which extends across the second lug assembly from the one side of the tie-rod assembly to the opposing second side of the tie rod assembly and between an outermost surface of the second lug assembly positioned on the one side of the tie-rod assembly and an outermost surface of the second lug assembly positioned on the opposing second side of the tie-rod assembly, wherein:
 the second cylindrical wall portion has a fourth set of threads defined in and which extend along the second cylindrical wall portion, such that the fourth set of threads are compatible for engaging the second set of threads of the tube member;
 the second cylindrical wall portion of the second clevis coupling assembly has a fourth width dimension, which extends across the second cylindrical wall portion and through an axial axis of the second cylindrical wall portion of the second clevis coupling assembly; and
 the fourth width dimension includes a portion of the fourth set of threads such that the fourth width dimension is greater than the third width dimension of the second lug assembly.

2. The tie-rod assembly of claim 1, wherein:
the third set of threads defines a first pitch diameter which extends through the third set of threads and is positioned about the axial axis of the first cylindrical wall portion;
the second width dimension which extends from the first pitch diameter on a first side of the first cylindrical wall portion, through the axial axis of the first cylindrical wall portion and to the first pitch diameter positioned on a second opposing side of the first cylindrical wall portion;

the fourth set of threads defines a second pitch diameter which extends through the fourth set of threads and is positioned about the axial axis of the second cylindrical wall portion; and
the fourth width dimension, which extends from the second pitch diameter on a first side of the second cylindrical wall portion, through the axial axis of the second cylindrical wall portion and to the second pitch diameter positioned on a second opposing side of the second cylindrical wall portion.

3. The tie-rod assembly of claim 1, wherein the first set of threads are defined within an external side of the first end of the tube member and the second set of threads are defined within an internal side of the second end of the tube member.

4. The tie-rod assembly of claim 3, wherein:
the first clevis coupling assembly comprises the first cylindrical wall portion with the first transition wall member which connects the first cylindrical wall portion to the first lug assembly;
the third set of threads are defined within an internal side of the first cylindrical wall portion; and
the first lug assembly comprises a first wall enclosure which defines two spaced apart planar wall portions and two spaced apart curved wall portions with aligned bores defined through the two spaced apart planar wall portions.

5. The tie-rod assembly of claim 3, wherein:
the second clevis coupling assembly comprises the second cylindrical wall portion with the second transition wall member which connects the second cylindrical wall portion to the second lug assembly;
the fourth set of threads are defined within an external side of the second cylindrical wall portion; and
the second lug assembly comprises a wall member, which extends from the second transition wall member and defines two planar sides and two curved sides with a bore defined extending through the wall member and the two planar sides.

6. The tie-rod assembly of claim 1, wherein the first set of threads are defined within an external side of the first end of the tube member and the second set of threads are defined within an external side of the second end of the tube member.

7. The tie-rod assembly of claim 6, wherein:
the first clevis coupling assembly comprises the first cylindrical wall portion with the first transition wall member which connects the first cylindrical wall portion to the first lug assembly;
the third set of threads are defined in an internal side of the first cylindrical wall portion; and
the first lug assembly comprises a first wall enclosure which defines two spaced apart planar wall portions and two spaced apart curved wall portions with aligned bores defined through the two spaced apart planar wall portions.

8. The tie-rod assembly of claim 6, wherein:
the second clevis coupling assembly comprises the second cylindrical wall portion with the second transition wall member which connects the second cylindrical wall portion to the second lug assembly;
the fourth set of threads are defined in an internal side of the second cylindrical wall portion; and
the second lug assembly comprises a wall member which extends from the second transition wall member and defines two planar sides and two curved sides with a bore defined extending through the wall member and the two planar sides.

9. The tie-rod assembly of claim 1, wherein the first set of threads are defined within an internal side of the first end of the tube member and the second set of threads are defined within an internal side of the second end of the tube member.

10. The tie-rod assembly of claim 9, wherein:
the first clevis coupling assembly comprises the first cylindrical wall portion with the first transition wall member which connects the first cylindrical wall portion to the first lug assembly;
the third set of threads are defined in an external side of the first cylindrical wall portion; and
the first lug assembly comprises a first wall enclosure which defines two spaced apart planar wall portions and two spaced apart curved wall portions with aligned bores defined through the two spaced apart planar wall portions.

11. The tie-rod assembly of claim 9, wherein:
the second clevis coupling assembly comprises the second cylindrical wall portion with the second transition wall member which connects the second cylindrical wall portion to the second lug assembly;
the fourth set of threads are defined in an external side of the second cylindrical wall portion; and
the second lug assembly comprises a wall member which extends from the second transition wall member and defines two planar sides and two curved sides with a bore defined extending through the wall member and the two planar sides.

12. The tie-rod assembly of claim 1, wherein:
the first set of threads are defined within an external side of the first end of the tube member and the second set of threads are defined within an internal side of the second end of the tube member; and
the first end of the tube member has a wall thickness dimension greater than a wall thickness of a central portion of the tube member positioned between the first end and the second end of the tube member and the second end has a second wall thickness greater than the wall thickness of the central portion of the tube member.

13. The tie-rod assembly of claim 12, wherein:
the first clevis coupling assembly comprises the first cylindrical wall portion with the first transition wall member which connects the first cylindrical wall portion to the first lug assembly;
the third set of threads are defined within an internal side of the first cylindrical wall portion; and
the first lug assembly comprises a first wall enclosure which defines two spaced apart planar wall portions and two spaced apart curved wall portions with aligned bores defined through the two spaced apart planar wall portions.

14. The tie-rod assembly of claim 12, wherein:
the second clevis coupling assembly comprises the second cylindrical wall portion with the second transition wall member which connects the second cylindrical wall portion to the second lug assembly;
the fourth set of threads are defined within an external side of the second cylindrical wall portion; and
the second lug assembly comprises a wall member, which extends from the second transition wall member and defines two planar sides and two curved sides with a bore defined extending through the wall member and the two planar sides.

15. The tie-rod assembly of claim 1, wherein the first set of threads is one of a right hand thread or a left hand thread and the second set of threads is other of the one of the right hand thread or the left hand thread of the first set of threads.

16. A method for fabricating a tie-rod assembly, comprising:
extruding a tube member having a first end having a cylindrical wall configuration and turning a first set of threads in the first end of the tube member and the tube member having a second end having a cylindrical wall configuration and turning a second set of threads in the second end of the tube member;
swaging a first tube forming a first clevis coupling assembly, which includes:
a first cylindrical wall portion connected to a first transition wall member, which extends from the first cylindrical wall portion and forms an opening through the first transition wall member, wherein the first transition wall member connects a first lug assembly to the first cylindrical wall portion; and
the first lug assembly has a first width dimension, which extends across the first lug assembly from an one side of the tie-rod assembly to an opposing second side of the tie-rod assembly, extending between an outermost surface of the first lug assembly positioned on the one side of the tie-rod assembly and an outermost surface of the first lug assembly positioned on the opposing second side of the tie-rod assembly wherein:
the first cylindrical wall portion has a third set of threads defined in and which extend along the first cylindrical wall portion compatible for engaging the first set of threads of the tube member;
the first cylindrical wall portion of the first clevis coupling assembly has a second width dimension, which extends across the first cylindrical wall portion and through an axial axis of the first cylindrical wall portion of the first clevis coupling assembly; and
the second width dimension includes a portion of the third set of threads such that the second width dimension is greater than the first width dimension of the first lug assembly; and
impact extruding a second clevis coupling assembly, which includes:
a second cylindrical wall portion connected to a second transition wall member, which extends from the second cylindrical wall portion and forms an opening through the second transition wall member, wherein the second transition wall member connects a second lug assembly to the second cylindrical wall portion; and
the second lug assembly has a third width dimension, which extends across the second lug assembly from the one side of the tie-rod assembly to the opposing second side of the tie-rod assembly and between an outermost surface of the second lug assembly positioned on the one side of the tie-rod assembly and an outermost surface of the second lug assembly positioned on the opposing second side of the tie-rod assembly wherein:
the second cylindrical wall portion has a fourth set of threads defined in and which extend along the second cylindrical wall portion, which are compatible for engaging the second set of threads of the tube member;
the second cylindrical wall portion of the second clevis coupling assembly has a fourth width dimension which extends across the second cylindrical wall portion and through an axial axis of the second cylindrical wall portion of the second clevis coupling assembly; and the fourth width dimension includes a portion of the fourth set of threads such that the fourth width dimension is greater than the third width dimension of the second lug assembly.

17. The method of claim 16, wherein:

the third set of threads defines a first pitch diameter which extends through the third set of threads and is positioned about the axial axis of the first cylindrical wall portion;

the second width dimension, which extends from the first pitch diameter on a first side of the first cylindrical wall portion, through the axial axis of the first cylindrical wall portion and to the first pitch diameter positioned on a second opposing side of the first cylindrical wall portion;

the fourth set of threads defines a second pitch diameter which extends through the fourth set of threads and is positioned about the axial axis of the second cylindrical wall portion; and the fourth width dimension, which extends from the second pitch diameter of the first side of the second cylindrical wall portion, through the axial axis of the second cylindrical wall portion and to the second pitch diameter positioned on a second opposing side of the second cylindrical wall portion.

18. The method of claim 16, further including:

boring aligned bores through two spaced apart planar wall portions of the first lug assembly; and boring a bore through a wall member of the second lug assembly.

19. The method of claim 16, further including swaging the tube member such that:

the first end of the tube member has a first wall thickness dimension greater than a second wall thickness of a central portion of the tube member positioned between the first end and the second end of the tube member; and the second end has a third wall thickness greater than the second wall thickness of the central portion of the tube member, wherein the first set of threads is positioned in the first end of the tube member and the second set of threads is positioned in the second end of the tube member.

20. The method of claim 16, wherein the first set of threads is one of a right hand thread or a left hand thread and the second set of threads is other of the one of the right hand thread or left hand thread of the first set of threads.

21. A system, comprising:

a first structure;

a second structure; and a tie-rod assembly coupling the first structure and the second structure, the tie-rod assembly comprising:

a tube member having a cylindrical wall configuration with a first set of threads defined in and which extend along the cylindrical wall configuration at a first end of the tube member and a second set of threads defined in and which extend along the cylindrical wall configuration at a second end of the tube member;

a first clevis coupling assembly, comprising:

a first cylindrical wall portion connected to a first transition wall member, which extends from the first cylindrical wall portion and forms an opening through the first transition wall member, wherein the first transition wall member connects a first lug assembly to the first cylindrical wall portion; and the first lug assembly has a first width dimension, which extends across the first lug assembly from an one side of the tie-rod assembly to an opposing second side of the tie-rod assembly and between an outermost surface of the first lug assembly positioned on the one side of the tie-rod assembly and an outermost surface of the first lug assembly positioned on the opposing second side of the tie-rod assembly wherein:

the first cylindrical wall portion has a third set of threads defined in and which extend along the first cylindrical wall portion, which are compatible for engaging the first set of threads of the tube member;

the first cylindrical wall portion of the first clevis coupling assembly has a second width dimension which extends across the first cylindrical wall portion and through an axial axis of the first cylindrical wall portion of the first clevis coupling assembly; and the second width dimension includes a portion of the third set of threads such that the second width dimension is greater than the first width dimension of the first lug assembly; and a second clevis coupling assembly, comprising:

a second cylindrical wall portion connected to a second transition wall member, which extends from the second cylindrical wall portion and forms an opening through the second transition wall member, wherein the second transition wall member connects a second lug assembly to the second cylindrical wall portion; and the second lug assembly has a third width dimension, which extends across the second lug assembly from the one side of the tie-rod assembly to the opposing second side of the tie-rod assembly and between an outermost surface of the second lug assembly positioned on the one side of the tie-rod assembly and an outermost surface of the second lug assembly positioned on the opposing second side of the tie-rod assembly, wherein:

the second cylindrical wall portion has a fourth set of threads defined in and which extend along the second cylindrical wall portion, such that the fourth set of threads are compatible for engaging the second set of threads of the tube member;

the second cylindrical wall portion of the second clevis coupling assembly has a fourth width dimension, which extends across the second cylindrical wall portion and through an axial axis of the second cylindrical wall portion of the second clevis coupling assembly; and the fourth width dimension includes a portion of the fourth set of threads, such that the fourth width dimension is greater than the third width dimension of the third lug assembly.

\* \* \* \* \*